United States Patent
Togai

Patent Number: 5,422,811
Date of Patent: Jun. 6, 1995

[54] ENGINE IGNITION TIMING CONTROL SYSTEM AND METHOD

[75] Inventor: Kazuhide Togai, Takatsuki, Japan

[73] Assignee: Mitsubishi Jidosha Kogyo Kabushiki Kaisha, Tokyo, Japan

[21] Appl. No.: 22,490

[22] Filed: Feb. 25, 1993

[30] Foreign Application Priority Data

Feb. 28, 1992 [JP] Japan ................... 4-044004

[51] Int. Cl.⁶ .................................. G06F 15/48
[52] U.S. Cl. .................. 364/431.05; 364/431.03; 364/431.01; 123/425; 123/90.12; 123/417
[58] Field of Search ........ 364/431.01–431.05, 364/431.12; 123/425, 416, 638, 90.12, 339, 585, 417, 435, 302–308, 478, 481, 198 F

[56] References Cited

U.S. PATENT DOCUMENTS

| | | | |
|---|---|---|---|
| 4,009,695 | 3/1977 | Ule | 123/90.13 |
| 4,398,520 | 8/1983 | Schulz et al. | 123/481 |
| 4,398,526 | 8/1983 | Hamai et al. | 123/606 |
| 4,416,239 | 11/1983 | Takase et al. | 123/478 |
| 4,502,446 | 3/1985 | Kanegae et al. | 123/479 |
| 4,587,938 | 5/1986 | Kobayashi et al. | 123/416 |
| 4,694,794 | 9/1987 | Kato et al. | 123/306 |
| 4,819,603 | 4/1989 | Morita et al. | 123/425 |
| 4,825,832 | 5/1989 | Satoh et al. | 123/425 |
| 4,945,870 | 8/1990 | Richeson | 123/90.11 |
| 5,010,862 | 4/1991 | Hashimoto et al. | 123/339 |
| 5,259,357 | 11/1993 | Shimizu et al. | 123/638 |

FOREIGN PATENT DOCUMENTS

| | | |
|---|---|---|
| 0229643 | 7/1987 | European Pat. Off. |
| 3400786 | 7/1985 | Germany |
| 61-66843 | 4/1986 | Japan |
| 64-80736 | 3/1989 | Japan |
| 4171245 | 6/1992 | Japan |
| 2042637 | 9/1980 | United Kingdom |

Primary Examiner—Kevin J. Teska
Assistant Examiner—Jacques H. Louis-Jacques

[57] ABSTRACT

An ignition timing control system and method for multicylinder internal combustion engine, utilizing a variable valve operating system such as variable valve timing system and a partial cylinder operating system. An engine control unit calculates a standard ignition timing for each cylinder according to the valve operating condition, rotational speed of the engine and intake air pressure. The control unit also calculates a target ignition timing by compensating the standard ignition timing according to an operating condition of the vehicle and controls an ignition driver to operate an ignitor associated with each cylinder at the target ignition timing.

22 Claims, 8 Drawing Sheets

ENGINE IGNITION TIMING CONTROL SYSTEM AND METHOD

BACKGROUND OF THE INVENTION

The present invention relates to an engine ignition timing control system and a method which are designed to utilize a speed density system for calculating the quantity of intake air in the combustion chamber of an internal combustion engine on the basis of pressure data in the intake manifold of the internal combustion engine and which have variable cylinder operation modes.

The control system of the conventional internal combustion engine is so constructed that many operation data of the engine are gathered by many sensors for calculating predetermined control values in response to the operation data with suitable calculating means so that many actuators are driven by output signals responsive to the calculated control values to enable many mechanisms to be controllably driven in response to the predetermined control values.

In the conventional internal combustion engine, the quantity of intake air (A/N) to be supplied to the combustion chamber is adjusted in response to the opening of a throttle valve, and the quantity of fuel corresponding to the quantity of intake air in response to the opening of the throttle valve and the revolution of the engine is supplied to the combustion chamber of the engine so as to perform an ignition process at an adequate ignition timing in response to the quantity of intake air and the revolution of the engine.

There has been well known in the art a typical engine which employs an ignition timing control system called "a speed density system" for calculating intake air quantity data for use in a fuel supply mechanism and advanced angle quantity data for use in ignition timing control on the basis of pressure levels of air in the intake manifold. The speed density system is advantageous in that a pressure sensor is provided in an air duct held in communication with the intake manifold to sense pressure levels of air in the intake manifold by way of the air duct instead of an airflow sensor provided in the intake manifold to directly sense the quantity of intake air in the intake manifold, resulting in reducing the intake air resistance of the intake manifold and thus in decreasing costs of the sensors.

On the other hand, the internal combustion engine having such a speed density system is operated in such a manner that a map is prepared for a standard ignition timing $\theta b$ in response to an intake manifold pressure Pb in place of an intake air quantity A/N and an engine revolution Ne upon calculation of the ignition timing of the engine. In such an internal combustion engine, the standard ignition timing $\theta b$ is initially calculated in response to the engine revolution Ne and the intake manifold pressure Pb, and then compensated on the basis of coolant temperature Twt, intake air temperature Ta and the like for the purpose of calculating a target ignition timing $\theta adv$.

In the conventional speed density system, the intake manifold pressure including the intake air quantity data is sensed for calculation of the intake air quantity and the ignition timing of the engine so that the operation mode variation of each of the cylinders of the engine such as, for example, the variation of the valve opening and closing timing caused by high and low cams of the intake and exhaust mechanism, and the variation of the intake air quantity caused by switching all cylinders operating conditions and partial cylinders operating conditions in which the intake and exhaust mechanisms of the cylinders are partially held in their non-operating condition. This results in the fact that the intake air pressure, the intake air quantity and the ignition timing of the engine are not associated with each other, thereby reducing desirable levels of the calculated intake air quantity and ignition timing of the engine.

SUMMARY OF THE INVENTION

It is therefore an object of the present invention to provide ignition timing control system and method of an engine which ensure the desirable level of the ignition timing calculated by the speed density system. An ignition timing control system for an internal combustion engine according to the present invention comprises engine revolution speed detecting means for detecting engine revolution speed of an engine to produce an output signal of engine revolution speed data of the engine, valve motion condition determining means for determining valve motion condition data of the engine to produce an output signal of the valve motion condition data for each of cylinders assembled in the engine, intake air pressure detecting means for detecting intake air pressure of air to be introduced into an intake manifold to produce an output signal of pressure data of the intake manifold, standard ignition timing calculating means for preparing a plurality of standard ignition timing calculating maps each of which shows the air pressure data of air in the intake manifold and the engine revolution speed data varied in response to the valve motion condition data and selecting one of the standard ignition timing maps in response to the valve motion condition data to calculate a standard ignition timing of each of the cylinders, target ignition timing calculating means for calculating for each of the cylinders a target ignition timing by compensating the standard ignition timing on the basis of the operating condition of the engine, and ignition driving means for driving the ignitor associated with each of the cylinders of the engine at the target ignition timing. An ignition timing control method for an internal combustion engine according to the present invention comprises the steps of detecting engine revolution speed of an engine to produce an output signal of engine revolution speed data of the engine, determining valve motion condition data of the engine to produce an output signal of the valve motion condition data for each of cylinders assembled in the engine, detecting intake air pressure of air to be introduced into the intake manifold to produce an output signal of air pressure data of the intake manifold, preparing a plurality of standard ignition timing calculating maps each of which shows the air pressure data of the intake manifold and the engine revolution speed data varied in response to valve motion condition data, selecting one of the standard ignition timing maps in response to the valve motion condition data and calculating a standard ignition timing of each of the cylinders, calculating for each of the cylinders a target ignition timing by compensating the standard ignition timing on the basis of the operating condition of the engine, and driving an ignitor associated with each of the cylinders of the engine at the target ignition timing.

The system and method according to the present invention, the standard ignition timing calculation includes determining variation of the valve motion condition data on the basis of the valve motion condition data inputted from the valve motion condition determining means, and calculating for each of the cylinders a standard ignition timing on a smooth leveled line from the standard ignition timing calculated before the first time when the variation of the valve motion condition data is determined by the operation mode variation determining means to the standard ignition timing calculated after the second time when a predetermined time lapses after variation of the valve motion condition data is determined by the operation mode variation determining means. This results in the fact that the standard ignition timing is not excessively deviated from the target ignition timing after the variation of the valve motion condition data is determined.

The system and method according to the present invention, an predetermined time is determined as being lapsed after the variation of the valve motion condition data is determined by the operation mode variation determining means, whereupon the standard ignition timing calculated at the present time is calculated as being the standard ignition timing, thereby making it possible to simplify the control after the predetermined time.

BRIEF DESCRIPTION OF THE DRAWINGS

The features and advantages of the engine ignition timing control system and method according to the present invention will be more clearly understood from the following detailed description taken in conjunction with the accompanying drawings, in which.

DESCRIPTION OF THE PREFERRED EMBODIMENTS

Figure 1:
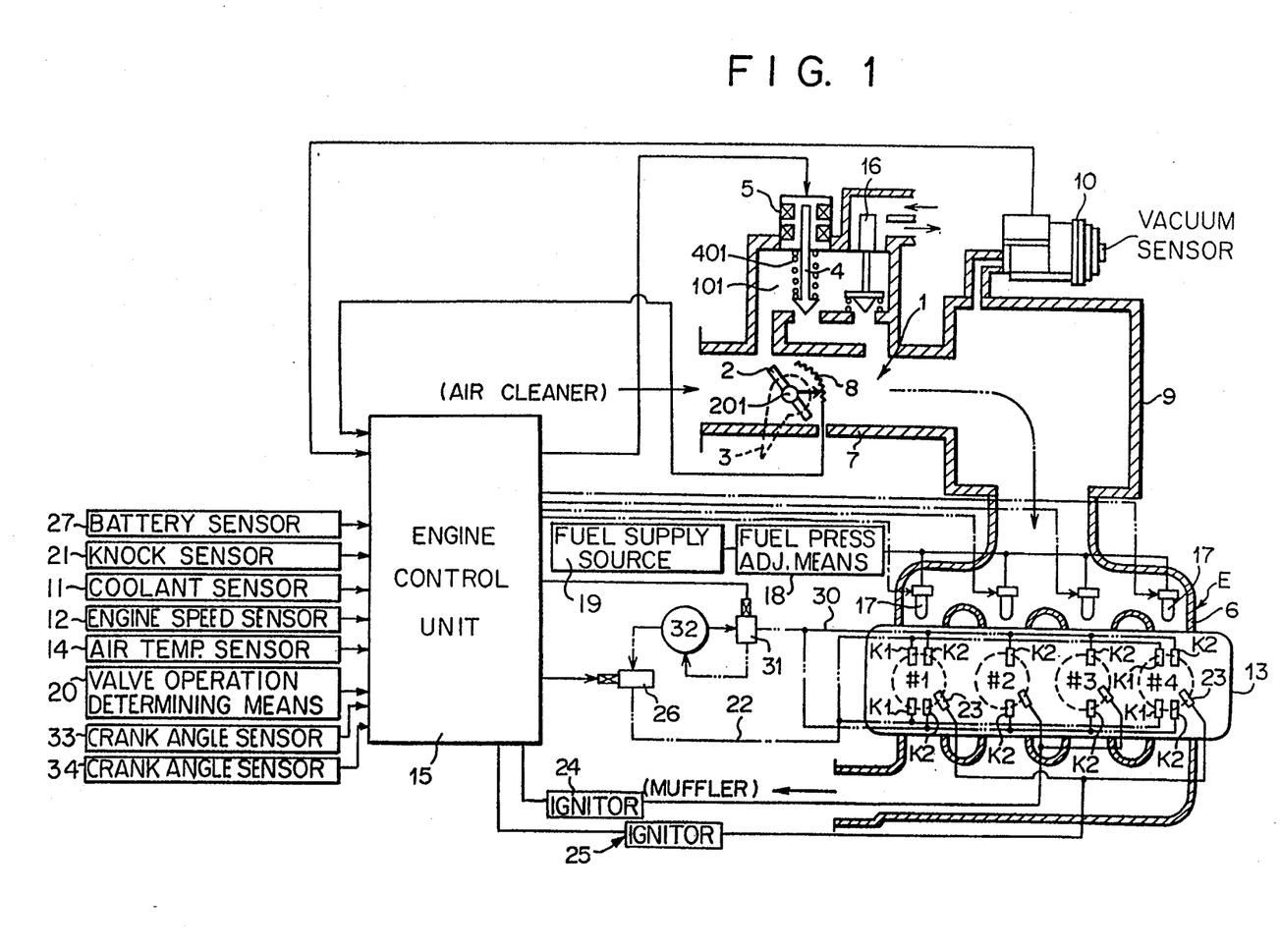
FIG. 1 is a general constitutional view of an engine ignition timing control system exemplifying the present invention.

An ignition timing control system is shown in FIG. 1 as assembled in a four cylinders, in-line engine (simply referred to as "engine E") having a mechanism for switching and varying valve motion conditions of intake and exhaust valves. The engine E comprises an intake manifold 1 which is constituted by an intake branched duct 6, a surge tank 9 securely connected to the intake branched duct 6, an intake duct 7 integrally formed with the surge tank 9, and an air cleaner not shown. The intake duct 7 is adapted to rotatably receive therein a throttle valve 2 having a rotational shaft 201 connected to a throttle lever 3 at the outer side of the intake manifold 1.

The throttle lever 3 is connected to and rotated by an accelerator pedal (not shown) in such a manner that the throttle valve 2 is rotated in clockwise and anti-clockwise directions as shown in FIG. 1 by the throttle lever 3. The throttle valve 2 is forced to be closed by a suitable return spring (not shown) when the accelerator pedal is released to its home position. The throttle valve 2 is assembled with a throttle valve opening sensor 8 for producing an output signal of the opening data of the throttle valve 2.

On the other hand, an intake bypass duct 101 is connected to the intake duct 7 in such a manner as to bypass the throttle valve 2 and is provided with an idle revolution control (ISC) valve 4 forced to be closed by a return spring 401 and driven by a stepping motor 5. The reference numeral 16 designates a fast idle air valve which is designed to automatically perform a warming-up compensation in response to temperature of a coolant in the engine during the idling state of the engine.

Further, the intake air temperature detecting means comprises an intake air temperature sensor 14 provided in the intake manifold 1 for producing an output signal of the data for intake air temperature (Ta). The engine is provided with a coolant sensor 11 for detecting the temperature of the coolant therein. The engine revolution speed detecting means comprises an engine revolution sensor 12 for detecting the engine revolution in the form of ignition pulses. The battery voltage detecting means comprises a battery sensor 27 for detecting a battery voltage VB. A knock sensor 21 is also provided for producing an output signal of knock data of the engine. The intake air pressure detecting means comprises a vacuum sensor 10 provided in the surge tank 9 for producing an intake manifold pressure (Pb) data.

A cylinder head 13 forming in part the engine is provided with intake and exhaust passageways capable of being in communication with each of cylinders formed in the engine and opened and closed respectively by intake and exhaust valves (not shown) forming as a whole a valve motion system. The valve motion system is designed to be operatable under a low speed mode M-1 and a high speed mode M-2 by selectively driving low and high speed cams, respectively, while being operable under partial cylinders operating mode (modulated displacement mode) M-3 by holding the intake and exhaust valves of a first cylinder #1 and a fourth cylinder in their non-operating conditions, respectively, with a second cylinder #2 and a third cylinder #3 being held in their operational conditions, respectively. The valve motion system comprises rocker arms assembled With low and high speed mode switching mechanism K1 and K2, the former of which is designed to hydraulically hold the low speed cams of the intake and exhaust valves under their operating conditions at a predetermined low speed mode, and the latter of which is similarly designed to hydraulically hold the high speed cams of the intake and exhaust valves under their operating conditions at a predetermined high speed mode. The low and high speed mode switching mechanisms K1 and K2 are well known in the art and so constructed as to have the low and high speed cams and the rocker arms selectively engaged with and disengaged from each other by hydraulically switching the engagement and disengagement conditions between the rocker arms and their rocker arm shafts by way of respective slide pins not shown.

The low speed mode switching mechanism K1 forming a valve motion condition switching mechanism is fed with pressure oil by a pressure oil circuit 22 through a first electromagnetic valve 26, while the high speed mode switching mechanism K2 also forming the valve motion condition switching mechanism is fed with pressure oil by a pressure oil circuit 30 through a second electromagnetic valve 31. It will be understood that both of the first electromagnetic valve 26 and the second electromagnetic valve 31 respectively having three-way constructions are not energized under the low speed mode M-1 of the valve motion system, while both of the first electromagnetic valve 26 and the second electromagnet valve 31 are energized under the high speed mode M-2 of the valve motion system. The first electromagnetic valve 26 is energized, while the second electromagnetic valve 31 in not energized under the partial cylinders operating mode M-3 of the valve motion system. The above electromagnetic valves 26 and 31 are controlled by the output driving signal of an engine control unit (ECU) 15 which will be described hereinafter.

The cylinder head 13 is shown in FIG. 1 as provided with injectors 17 for injecting fuel to the cylinders, respectively, in such a manner that the injectors 17 are supplied from an fuel supply source 19 with fuel adjusted under a predetermined pressure level by a fuel pressure adjusting means 18. The injection control is carried out by the engine control unit 15 mentioned above.

The cylinder head 13 is assembled with ignition plugs 23 for the respective cylinders under the condition that the ignition plugs 23 of the cylinders #2 and #3, always held under their operating conditions, are electrically connected to an ignitor 24 provided in a single ignition driving circuit and that the ignition plugs 23 of the cylinders #1 and #4 which can be held either under their operating or non-operating conditions are electrically connected to an ignitor 25 provided in another single ignition driving circuit. Both of the ignitors 24 and 25 are electrically connected to the engine control unit 15.

Figure 3:
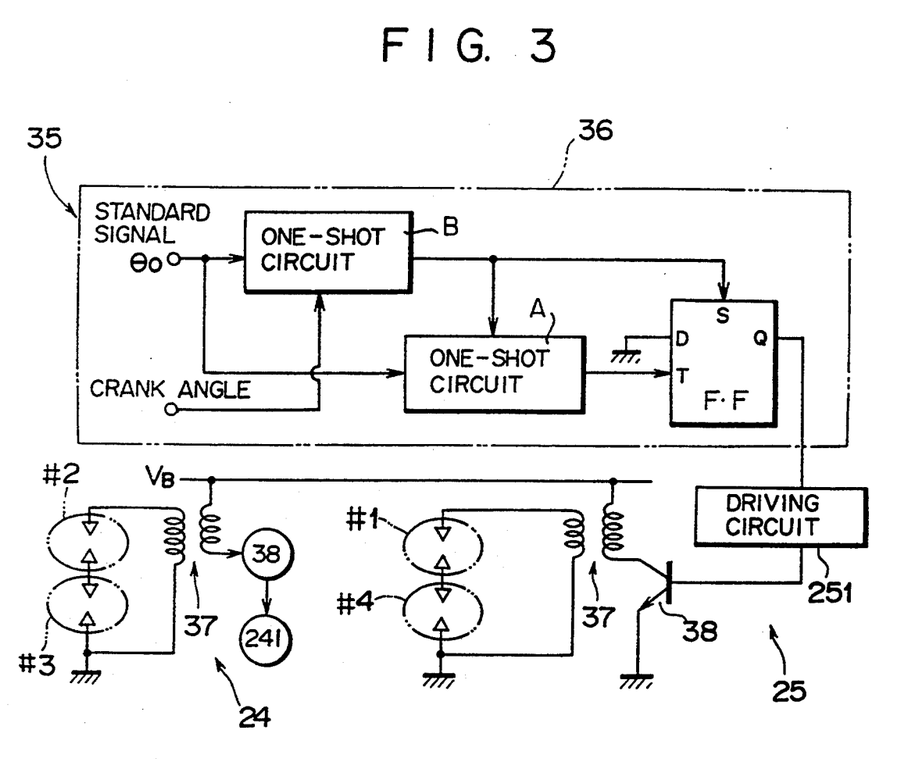
FIG. 3 is a block diagram of an ignition driving circuit provided in the ignition timing control system shown in FIG. 1.

The ignition driving circuit comprises a pair of timing control circuit 36 provided in the engine control unit 15 and a pair of driving circuits 241 and 251 for the respective ignitors 24 and 25. Only one of the control ciruit 36 is shown in FIG. 3. To the driving circuit 241 and 251 are electrically connected respectively power transistors 37 and 38 which are adapted to control opening and closing timing and energization time thereto and which are electrically connected to ignition coils 37 and 37.

Figure 4:
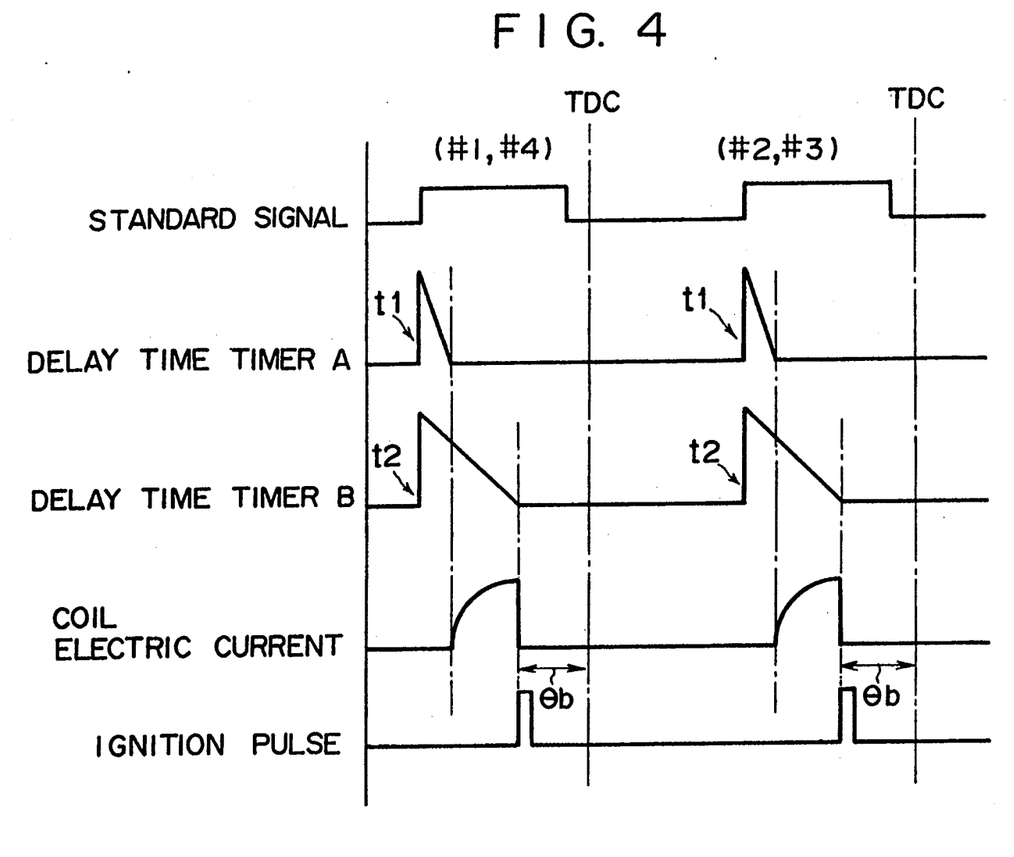
FIG. 4 is a block diagram representing the progressive motion of the ignition driving circuit in the ignition timing control system shown in FIG. 1.

The timing control circuits 36 are respectively associated with the cylinders #1 and #4 capable of being held under their non-operating conditions and the cylinders #2 and #3 always held under their operating conditions in such a manner that the cylinders #1 to #4 are driven by standard signals ($\theta_o$ of a crank angle) of crank angle sensors 34 and crank angle signals (1° or 2° ($\Delta\theta$) of a unit pulse) of unit crank angle sensors 33. The cylinders #1 and #4 are shown in FIG. 3, but the cylinders #2 and #3 are not shown. The standard signal $\theta_o$ is output to a one-shot circuit B so that the one-shot circuit B is triggered by the standard signal (on-off) of upper dead point $\theta_o$ (for example 75°) and the energization commencement signal is outputted and counts a predetermined delay time t1 after crank angle signals (a unit pulse 1° or 2°) are produced as best shown in FIG. 4. In this case, a target ignition timing $\theta b$ is calculated from the step b9 of a flowchart as will be described in FIG. 8.

The one-shot circuit A is similarly triggered by the standard signal (on-off) and counts a delay time t1 and a predetermined number (delay time t2) of the crank signal corresponding to the dwell angle so as to produce ignition signals.

A flip-flop F·F is set by the energization commencement signal of the one-shot circuit B and reset by the ignition signal of the one-shot circuit A. The opening and closing driving circuit 251 causes the power transistor 38 to be held "ON" during a period of time of the flip-flop F·F being set so as to maintain the ignition coil 37 energized. The ignition coil 37 causes its secondary side to have a high voltage current when the power transistor 38 is switched "OFF" so that the high voltage current is transmitted to and ignites the ignition plugs 23 of the cylinders #1 and #4 held in their non-operating conditions.

Similarly, the timing control circuit (not shown) for the cylinders #2 and #3 is constructed in a similar manner as the timing control circuit for the cylinders #1 and #4. The secondary high voltage current of the ignition coil 37 is supplied to and ignites the cylinders #2 and #3 at their target ignition timing $\theta b$. The groups of the unworkable cylinders #1, #4 and the work cylinders #2 and #3 are alternately ignited at an interval, i.e., a crank angle of 180° degrees.

The essential part of the engine control unit 15 is constituted by a micro-computer to perform the valve motion condition switching control and the ignition timing control in addition to the fuel injection control of the engine 1 and the throttle valve driving control which are well known in the art.

Figure 2:
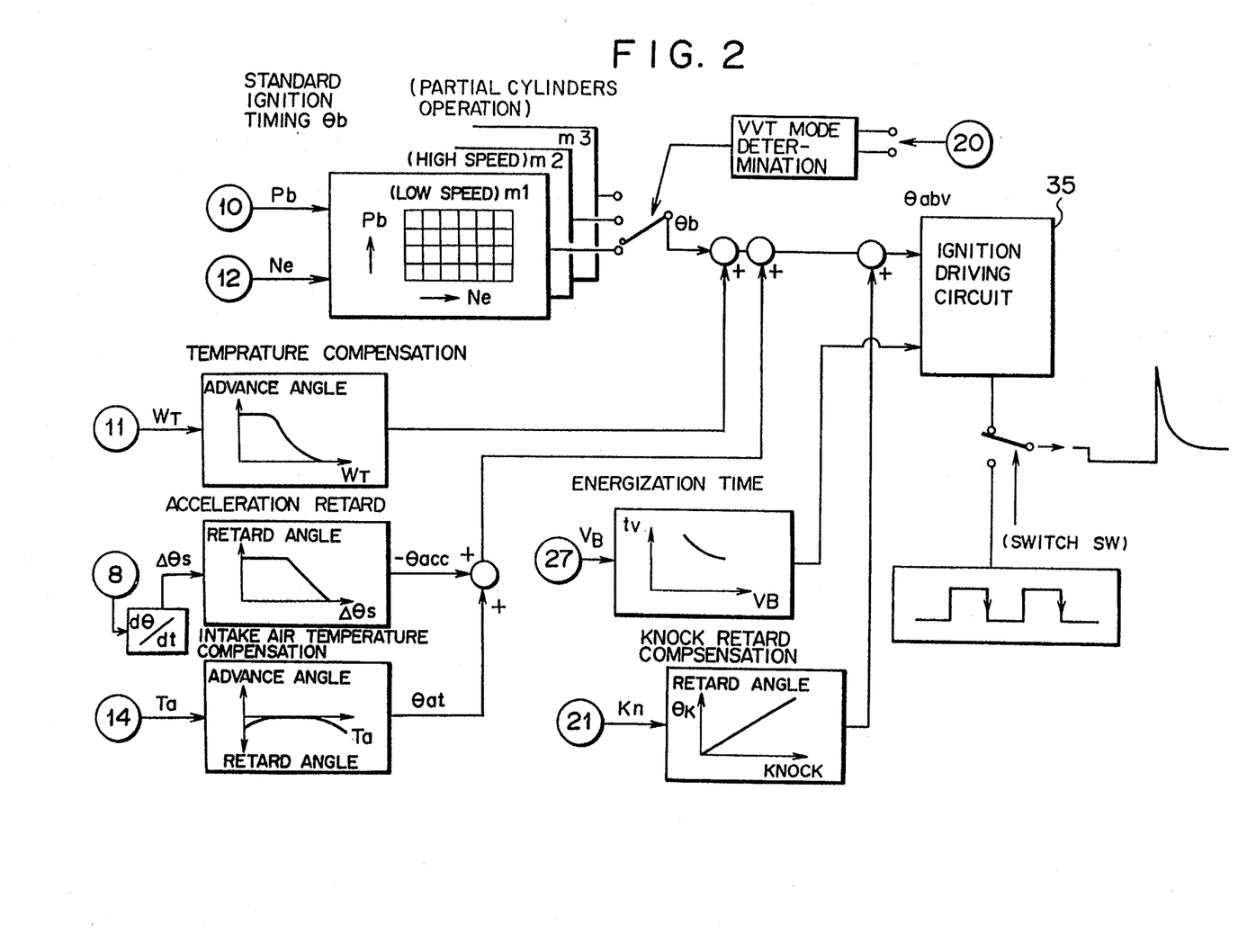
FIG. 2 is a block diagram representing the functions of the ignition timing control system shown in FIG. 1.

The engine control unit 15 is shown in FIG. 2 as comprising an engine revolution sensor 12 for detecting the engine revolution speed Ne and a vacuum sensor 10 for detecting the intake air pressure Pb. The engine control unit 15 further comprises valve motion condition determining means for determining driving signals of first and second electromagnetic valves 26 and 31 to produce output signals of the valve motion condition data for the respective cylinders held in their operating and non-operating conditions. The engine control unit 15 further comprises standard ignition timing calculating means for calculating the standard ignition timing $\theta b$ in response to the intake air pressure Pb and the engine revolution speed Ne on the basis of the valve motion condition data of each of the cylinders. The engine control unit 15 further comprises a coolant sensor 11 for detecting a coolant temperature WT, a throttle valve opening sensor 8 for detecting a throttle opening $\theta s$, an intake air temperature sensor 14 for detecting intake air temperature Ta, a battery sensor 27 for detecting battery voltage VB, and a knock sensor 21 for detecting a knock signal Kn. The ignition timing calculating means thus constructed calculates a target ignition timing $\theta adv$ by compensating the standard ignition timing $\theta b$ on the basis of the operation data of the internal combustion engine.

Figure 7:
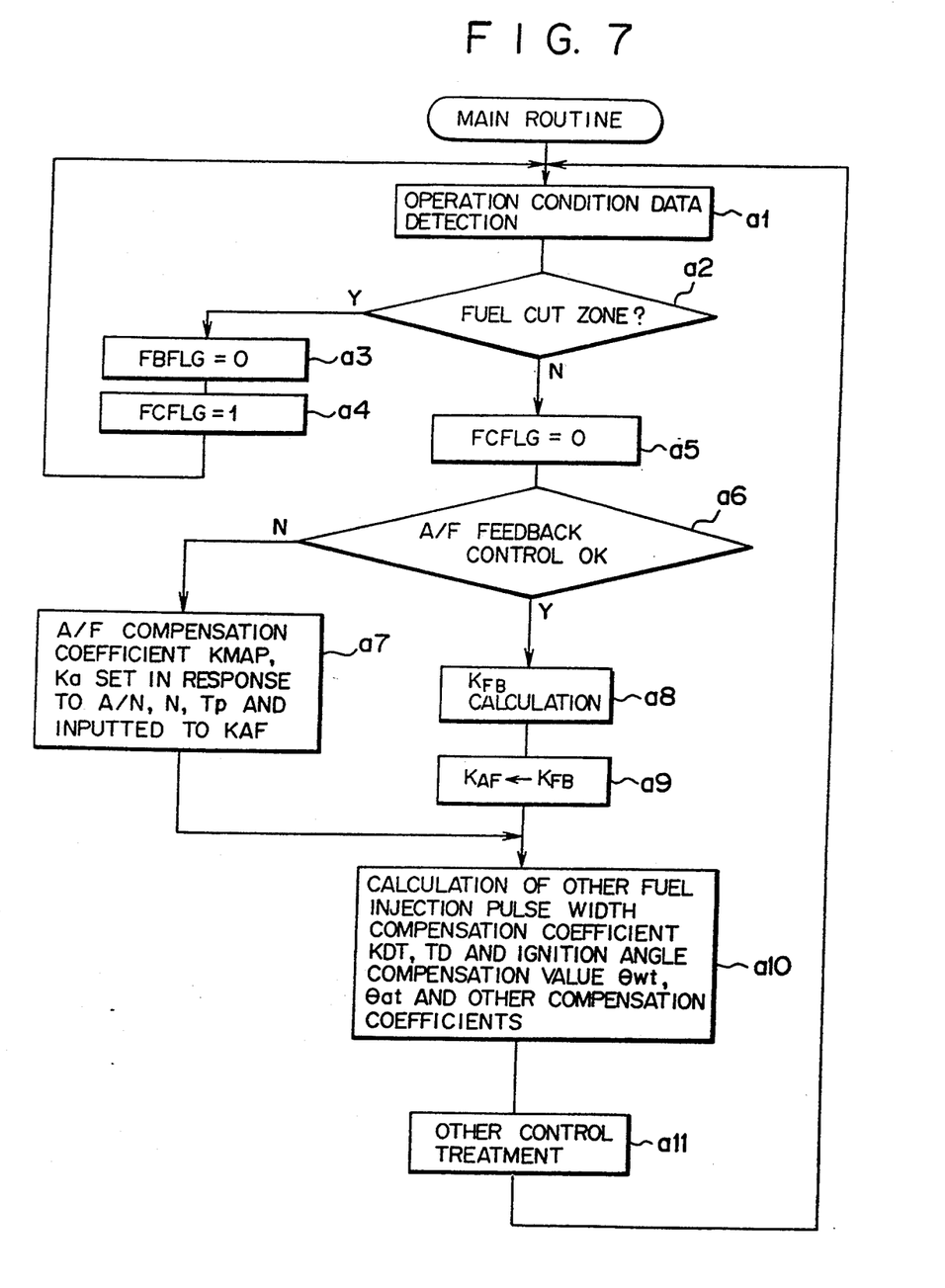
FIG. 7 is a flowchart of a main routine through which the ignition timing control system shown in FIG. 1 is operated.
Figure 8:
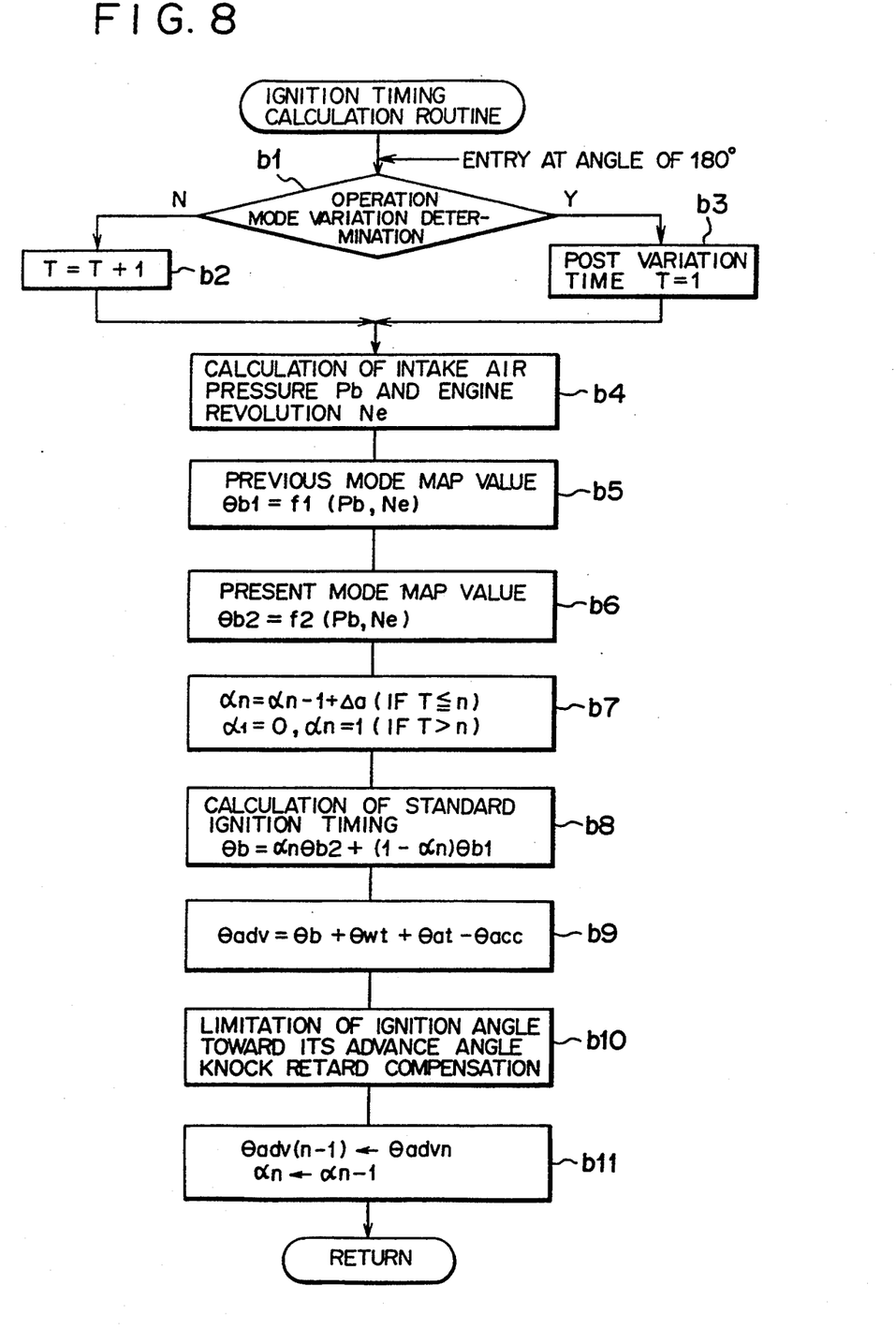
FIG. 8 is a flowchart of an ignition timing calculation routine carried out by the ignition timing control system of FIG. 1.
Figure 9:
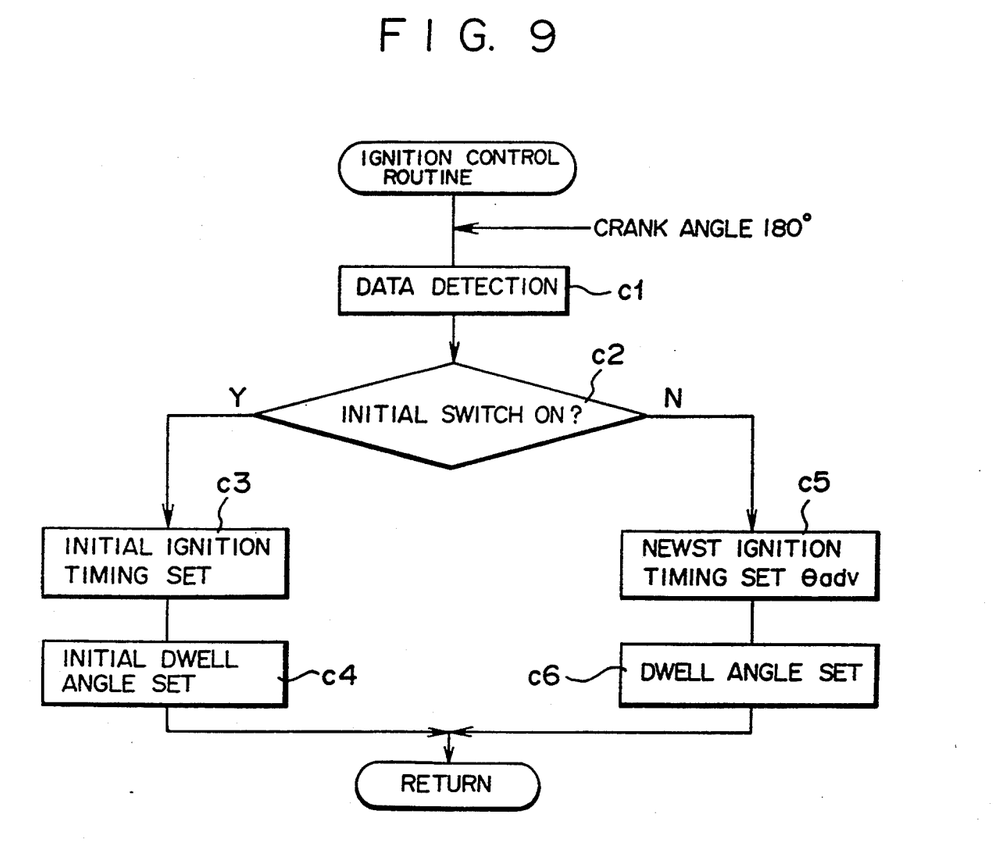
FIG. 9 is a flowchart of an ignition control routine carried by by the ignition timing control system of FIG. 1.

The ignition timing control system according to the present invention will be described along with its control program in FIGS. 7 to 9.

The main switch not shown is switched "ON" to commence the control of the engine control unit 15 along its main routine.

Initially, functions of the means forming the embodiment of the invention are checked with the initial values thereof being set, and then many sensors read many operation data for advancement of the operation to a step a2. A fuel cut zone is determined from an operation map calculating the operation zone on the basis of the engine revolution N and A/N as load data of the engine to have the operation advance to a step a3, where the air fuel ratio feedback FLG is cleared and returned with the fuel cut FLG "1" at a step a4.

On the other hand, when the operation condition of the engine is not maintained in the fuel cut zone at the step a2 to have the operation advance to the step a5, the fuel cut FLG is cleared, and whether or not the air by fuel ratio feedback condition is met, is then determined. At a step a7 upon the transition operation zone such as a power operation zone and before finish of the idling operation, the calculations are carried out on the air by fuel ratio compensation coefficient KMAP responsive to the present operation data (A/N, N) and the idling operation increase quantity compensation coefficient Ka responsive to the coolant temperature Tw through a proper idling operation increase quantity compensation coefficient calculating map. The calculated values are stored in the address KAF and the operation is then progressed to a step a10.

When the air fuel ratio feedback condition is met at the step a6, a target air fuel ratio responsive to the present operation data (A/N, N) is calculated for calculation of fuel quantity compensation coefficient $K_{FB}$ which can fulfil the above air by fuel ratio. At a step a9, the fuel coefficient $K_{FB}$ is stored in the address KAF to have the operation advance to the step a10.

At the step a10, the other fuel injection pulse width compensation coefficient KDT and the dead time compensation value TD of the fuel injection valve are set responsive to the operation condition of the engine to calculate each of compensation coefficients for use in the calculation of the target ignition timing $\theta adv$. The compensation values thus calculated comprises a coolant compensation value $\theta wt$ varied in response to the temperature drop of the coolant, an acceleration retard $\theta acc$ corresponding to the differential value $\Delta\theta s$ obtained by differentiating the throttle valve opening $\theta s$, an intake air temperature compensating value $\theta at$ varied in response to the temperature drop of the intake air, and a knock retard value $\theta k$ increased in response to the knock signal Kn. The subsequent calculation is performed on the battery compensation value tb with its energization time period to be increased in response to the drop of the battery voltage VB. The operation advances to the step a11 where the other well known controls are performed and is then returned to the initial step.

At the crank angle position of 180 degrees on the halfway of the main routine, the ignition timing calculating routine is executed.

In the present operation mode, the valve operation condition determining means 20 serves as determining and selecting any one of low and high speed modes M-1, M-2 and the partial cylinders operating mode M-3 in response to the "ON" and "OFF" data of the first and second electromagnetic valves 26 and 31. After determining and selecting the present operation mode, the operation mode variation determining means determines whether or not the present operation mode is identical to the previous operation mode. In the case of the operation mode being varied, the operation advances to a step b3, while in the case of the operation mode being not varied the operation advances to a step b2. At the step b3, the time T after the variation of the operation mode is "1", and the operation advances again to the step b1, subsequently advancing to the step b2 after the present operation mode is not varied from the previous operation mode, and then the time T after the variation of the operation mode is added by "1" to be renewed. It is to be noted that the operation mode variation determining means may include a function as the valve motion condition determining means.

At the step b4, the engine revolution Ne is detected by the engine revolution sensor 12 and the intake air pressure Pb is detected by the vacuum sensor 10.

At the step b5, the previous operation mode is determined as being in the low speed operation mode M-1, or the high speed operation mode M-2, or the partial cylinders operation mode M-3, and the standard ignition timing $\theta b1$ of the previous operation mode is calculated by the standard ignition timing maps m1, m2 and m3 as seen from FIG. 2. In this case, the low speed operation map m1 is employed for the low speed operation mode M-1 in the previous operation, the high speed operation map m2 is employed for the high speed operation mode in the previous operation, and the partial cylinders operation map m3 is employed for the non-operating cylinder mode M-3 in the previous operation.

At the step b6, the present operation mode is determined as being in the low speed operation mode M-1, or the high speed operation mode M-2, or the partial cylinders operation mode M-3, and the standard ignition timing $\theta b2$ of the present operation mode is calculated by the standard ignition timing calculating maps m1, m2 and m3 in a similar fashion as shown in FIG. 2.

At the steps b7 and b8, the standard ignition timing $\theta b$ is calculated in the following equation (3) by leveling the previous standard ignition timing $\theta b1$ and the present standard ignition timing $\theta b2$. A leveling coefficient $\alpha n$ is initially calculated in the following equations (1) and (2). Here, the leveling coefficients $\alpha n$ are calculated respectively by the equation (1) when the time T after the variation of the operation mode is lower than the predetermined value n and by the equation (2) when the time T after the variation of the operation mode is higher than the predetermined value n. $\Delta a$ represents a leveling ratio which is for example set at about 0.1.

$$\alpha_1 0$$

$$\alpha = 2_{n-1} + \Delta a \tag{1}$$

$$\alpha_n = 1 \tag{2}$$

$$\theta b = \alpha n \theta b2 + (1 - \alpha n)\theta b1 \tag{3}$$

Figure 5:
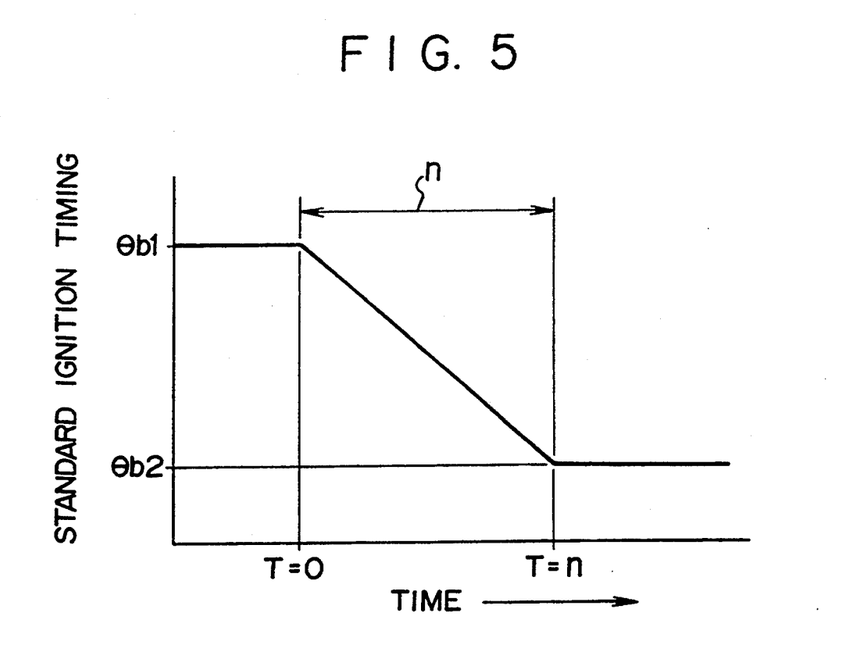
FIG. 5 is a progressive fluctuation diagram showing the standard ignition timings switched by the ignition timing control system shown in FIG. 1.

One example of the time progress variation characteristic of the standard ignition timing $\theta b$ thus calculated as above is shown in FIG. 5. It will be understood from FIG. 5 that the previous standard ignition timing $\theta b1$ is corrected to progressively approach the present standard ignition timing $\theta b2$ in response to the leveling ratio $\Delta a$. The above mentioned treatment results in the fact that the standard ignition timing $\theta b$ which is not precisely recognized upon the operation mode variation is corrected and compensated, thereby preventing the excessive deviation from the desirable ignition timing of each of the cylinders.

At the step b9, the acceleration retard $\theta acc$ is calculated for calculating the target ignition timing $\theta adv$ by the following equation (4).

$$\theta adv = \theta b + \theta wt + \theta at - \theta acc \qquad (4)$$

At the step b10, a predetermined retard quantity is calculated in response to the knock signal Kn by a suitable map not shown to correct the target ignition timing $\theta adv$ toward the retard side. The knock retard map is previously established as shown in FIG. 2.

At the step b11, the present ignition timing $\theta advn$ is stored in the previous ignition timing area $\theta adb_{(n-1)}$ and the present leveling coefficient $\alpha n$ is stored in the previous leveling coefficient area $\alpha_{(n-1)}$, then returning the operation to the main routine.

The ignition control treatment on the halfway of the main routine will now be described in FIG. 9.

The ignition control routine is executed on the basis of the fact that the standard signal $\theta_o$ is varied from "OFF" to "ON" when each of the cylinders are at every upper dead point 75° (75° BTDC) (a crank angle of 180 degrees) on the halfway of the main routine. At this step C1, a predetermined data is detected and at the step C2 whether the commencement switch not shown "ON" or "OFF" is determined. The operation advances to the steps C3 and C4 upon its initial stage, while the operation advances to the steps C5 and C6 upon its non-initial stage.

Figure 6:
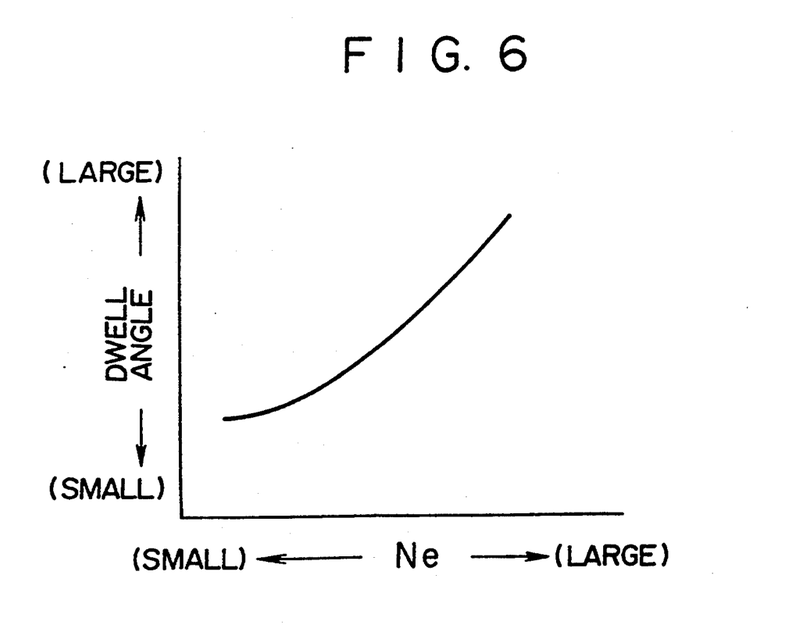
FIG. 6 is a characteristic block diagram of a dwell angle calculating map utilized by the ignition timing control system shown in FIG. 1.

When the operation advances to the steps C3 and C4 upon its the initial stage, the fixed ignition timing (for example BTDC5°) and the dwell angle upon their initial stages are respectively set and returned to the main routine. When the operation, on the other hand, advances to the steps C5 and C6 upon its non-initial stage, the newest target ignition timing $\theta adv$ and the dwell angle calculated from FIG. 6 are set to the timing control circuit 36 and returned to the main routine.

In the full operation mode, the cylinders #2 and #3 are simultaneously ignited by the ignitor 24 while the cylinders #1 and #4 are simultaneously ignited by the ignitor 25. When those ignitors 24 and 25 are driven at every crank angle of 180 degrees, one and the other groups of the operating and non-operating cylinders #2, #3, #1 and #4 are alternately ignited at the vicinity of their compression upper dead point of the cylinder and at the vicinity of their exhaust dead point of the cylinder.

The injector driving treatment is performed on the halfway of the main routine. The intake air quantity A/N calculated is detected in response to the intake air pressure Pb and the engine revolution Ne to calculate the standard fuel pulse width Tf. The target injector driving time is calculated by the air fuel ratio compensation coefficient KAF detected from the main routine, the compensation coefficient KDT of the atmospheric temperature and pressure, the injector action delay compensation value TD and the like. During the operations of all the cylinders the target fuel pulse widths Tinj are set to the drivers of all the injectors 17 of the cylinders #1-#4, while during the operations of the cylinders #1 and #4 held in their non-operating conditions the target fuel pulse widths Tinj are set to the drivers 17 of the cylinders #2 and #3 so as to trigger the drivers and to return the operation to the main routine.

As will be noted from the foregoing description, the present invention is advantageous in that the ignition timing can be performed for each of the cylinders of the internal combustion in response to the operation mode of the engine by detecting the engine revolution speed data and the intake manifold data by many sensors, determining the valve motion condition data, calculating the standard ignition timing in response to the valve motion condition data on the basis of the intake manifold pressure data and the engine revolution speed, and compensating the ignition timing of each of the cylinders to calculate the target ignition timing, resulting in the desirable ignition timing for each of the cylinders even in the speed density system.

What is claimed is:

1. A system for controlling ignition timing for an internal combustion engine comprising:
   a plurality of cylinders;
   intake valves disposed in each of said cylinders;
   exhaust valves disposed in each of said cylinders;
   valve motion condition control means for selectively controlling an operating condition of at least one of said intake valves and said exhaust valves;
   engine revolution speed detecting means for detecting engine revolution speed of an engine to produce an output signal of engine revolution speed data of the engine;
   valve motion condition determining means for determining valve motion condition of the engine to produce an output signal representative of valve motion condition data for each of said cylinders;
   said engine further including an intake manifold;
   intake air pressure detecting means for detecting intake pressure of air introduced into said intake manifold to produce an output signal representative of air pressure data of said intake manifold;
   a plurality of standard ignition timing calculating maps storing ignition timing data in relation to said air pressure data and said engine revolution speed, each varying with regard to said valve motion condition data;
   standard ignition timing calculating means for selecting one of said standard ignition timing maps in response to said valve motion condition data to calculate a standard ignition timing of each of the cylinders;
   target ignition timing calculating means for calculating for each of said cylinders a target ignition timing by compensating the standard ignition timing on the basis of the operating condition of said engine;
   said engine further including an ignitor associated with each of said cylinders; and
   ignition driving means for driving the said ignitor associated with each of said cylinders of the engine at said target ignition timing.

2. A system for controlling ignition timing for an internal combustion engine as set forth in claim 1, wherein said engine revolution speed detecting means includes an engine revolution sensor for detecting the engine revolution of the engine in the form of ignition pulses.

3. A system for controlling ignition timing for an internal combustion engine as set forth in claim 1, wherein said intake air pressure detecting means includes a vacuum sensor provided in said intake manifold of the engine.

4. A system for controlling timing for an internal combustion engine as set forth in claim 1, wherein said valve motion condition determining means determines whether one or more cylinders of the engine are held in their non-operating conditions by said valve motion condition control means or all cylinders of the engine are held in their operating conditions.

5. A system for controlling ignition timing for an internal combustion engine as set forth in claim 1, wherein said valve motion condition determining means determines whether the engine is held in a high speed operation condition or held in a low speed operation condition by said valve motion condition control means.

6. A system for controlling ignition timing for an internal combustion engine as set forth in claim 1, wherein said valve motion condition determining means determines whether the engine is held in an operating condition where one or more cylinders of the engine are held in their non-operating conditions, in a high speed operation condition, or in a low speed operation conditions.

7. A system for controlling ignition timing for an internal combustion engine as set forth in claim 1, wherein said standard ignition timing calculating means includes operation mode variation determining means for determining a change in said valve motion condition data determined by said valve motion condition determining means, means for calculating a present standard ignition timing corresponding to the valve motion condition data after the change in said valve motion condition is detected by said operation mode variation determining means, and means for varying the standard ignition timing from a previous standard ignition timing prior to the change in said valve motion condition to said present standard ignition timing calculated after the change in said valve motion condition, at a predetermined leveling ratio.

8. A system for controlling ignition timing for an internal combustion engine as set forth in claim 7, wherein said means for varying the standard ignition timing further includes means for calculating a lapse of time from the change in the valve motion condition data to complete the varying of the standard ignition timing to said present standard ignition timing within a predetermined period of time.

9. A system for controlling ignition timing for an internal combustion engine as set forth in claim 1, wherein said standard ignition timing calculating means for determining variation of said valve motion condition data on the basis of said valve motion condition data from said valve motion condition determining means, and means for calculating a standard ignition timing after elapsing of a predetermined time after the variation of the valve motion condition data is determined.

10. A system for controlling ignition timing for an internal combustion engine as set forth in claim 9, wherein said operation mode variation determining means includes means for calculating the lapse of time from the variation of said valve motion condition data.

11. A system for controlling ignition timing for an internal combustion engine as set forth in claim 1, wherein said target ignition timing is calculated on the basis of data including at least one compensation value selected from temperature of coolant in the engine, temperature of air in the intake manifold, the opening of the throttle valve provided in the intake manifold of the engine, knocking, and voltage level of battery.

12. A method for controlling ignition timing for an internal combustion engine comprising the steps of:
detecting engine revolution speed of an engine to produce an output signal of engine revolution speed data of the engine;
determining valve motion condition data of the engine to produce a valve motion condition data indicative of an operating condition of at least one of the intake valves and exhaust valves disposed in each of the cylinders assembled in the engine;
detecting intake air pressure data of air introduced into the intake manifold to produce an output signal representative of said air pressure data;
establishing a plurality of standard ignition timing calculating maps each of which shows said air pressure data of the intake manifold and said engine revolution speed data varied in response to said valve motion condition data;
selecting one of said standard ignition timing maps in response to said valve motion condition data and calculating a standard ignition timing of each of the cylinders;
calculating for each of said cylinders a target ignition timing by compensating the standard ignition timing on the basis of the operating condition of the engine; and
driving an ignitor associated with each of said cylinders of the engine at said target ignition timing.

13. A method for controlling ignition timing for an internal combustion engine as set forth in claim 12, wherein said engine revolution speed detection step is performed by an engine revolution sensor in the form of ignition pulses.

14. A method for controlling ignition timing for an internal combustion engine as set forth in claim 12, wherein the intake air pressure detection step is performed by a vacuum sensor provided in said intake manifold of the engine.

15. A method for controlling ignition timing for an internal combustion engine as set forth in claim 12, wherein the valve motion condition determination step includes the substep of determining whether one or more cylinders of the engine are held in their non-operating conditions or all cylinders of the engine are held in their operating conditions.

16. A method for controlling ignition timing for an internal combustion engine as set forth in claim 12, wherein the valve motion condition determination step includes the substep of determining whether the engine is held in a high speed operation condition derived from the valve motion conditions of the cylinder valves in the cylinders or held in a low speed operation condition derived from the valve motion conditions of said cylinder valves in the cylinders.

17. A method for controlling ignition timing for an internal combustion engine as set forth in claim 12, wherein the valve motion condition determination step includes the substep of determining whether the engine is held in an operation condition derived from one or more cylinders of the engine held in their non-operating conditions, the engine is held in a high speed operation condition derived from valve motion conditions of the cylinder valves in the cylinders, or held in a low speed operation condition derived from valve motion conditions of said cylinder valves in the cylinders.

18. A method for controlling ignition timing for an internal combustion engine as set forth in claim 12, wherein the standard ignition timing calculation step includes the substeps of determining variation of said valve motion condition data determined by said valve motion condition determination step, calculating a present standard ignition timing corresponding to the valve motion condition after the change in said valve motion condition is detected by said operation mode variation determining step, and varying the standard ignition timing from a previous standard ignition timing prior to the change in said valve motion condition to said present standard ignition timing calculated after the change in said valve motion condition, at a predetermined leveling ratio.

19. A method for controlling ignition timing for an internal combustion engine as set forth in claim 18, wherein said step for varying the standard ignition timing further includes the substep of calculating the lapse of time from the change in the valve motion condition data in which to complete the varying of said standard ignition timing.

20. A method for controlling ignition timing for an internal combustion engine as set forth in claim 12, wherein the standard ignition timing calculation step includes the substep of determining variation of said valve motion condition data on the basis of said valve motion condition data determined in said valve motion condition determination step, and calculating a standard ignition timing at a predetermined time after the variation of the valve motion condition data is determined.

21. A method for controlling ignition timing for an internal combustion engine as set forth in claim 20, wherein the operation mode variation determination step includes the substep of calculating the lapse of time from the variation of said valve motion condition data to the calculation of said standard ignition timing to thereby establish said predetermined time.

22. A method for controlling ignition timing for an internal combustion engine as set forth in claim 12, wherein the target ignition timing is calculated on the basis of data including at least one compensation value selected from temperature of coolant in the engine, temperature of air in the intake manifold, the opening of the throttle valve provided in the intake manifold of the engine, knocking, and voltage level of battery.

* * * * *